UNITED STATES PATENT OFFICE.

FRANCOIS LEBREIL, OF VILLEURBANNE, AND RAOUL DESGEORGE, OF LYON, FRANCE.

MANUFACTURE OF IMITATION HORN, SHELL, AND THE LIKE.

1,023,022. Specification of Letters Patent. Patented Apr. 9, 1912.
No Drawing. Application filed January 3, 1910. Serial No. 536,156.

*To all whom it may concern:*

Be it known that we, FRANCOIS LEBREIL and RAOUL DESGEORGE, citizens of the French Republic, residing, respectively, at Villeurbanne, Rhône, and Lyon, both in France, have invented certain new and useful Improvements in Manufacture of Imitation Horn, Shell, and the Like, of which the following is a specification.

The present invention relates to a process for the production of a plastic product in imitation of horn, shell and the like, and having the properties thereof, such product also being of a nature adapted to be worked with equal facility to celluloid, such as in the manufacture of combs, molded articles and the like.

The process broadly consists in imparting to casein the desired degree of plasticity whereby it may be formed into blocks, which can be cut into sheets of any thickness, as in the manufacture of celluloid.

The essential feature of the process is the action of a ketone on the casein, the latter being preferably in a fresh condition.

The operation of the process can be effected in various ways according to the following examples:—

Example I: To fresh casein, obtained at a high temperature and containing about 50 per cent. moisture, is added about 2 per cent. of a ketone, such as acetone and the whole is mixed in a suitable heating device preferably heated to above 100 degrees centigrade; that is under pressure. The heating is carried on for about a quarter of an hour, and the contents of the heating device are then projected into water through spaced orifices formed in the bottom of the apparatus, in order to subdivide as much as possible the mass under pressure contained therein while still hot and prior to contacting with water. The heating to above 100 degrees is for the purpose of causing the acetone to act more intimately upon the casein.

Example II: For increasing the transparency of the product, there can also be first added to the casein, for example about 2 per cent. of an acid such as nitric, sulfurous, acetic acid or the like, the heating then being effected as indicated above, and the contents projected into a current of warm or cold water according to requirements; then the same operations are repeated, substituting, however, the ketone for the acid. The substance is then ready to be manipulated in the same manner as celluloid.

The operations indicated above in Examples I and II, can also be effected with acetone, by adding to the latter an acid or a salt, or a substance soluble in acetone, such as a suitable gum.

The casein product prepared as above described, either by the action of acetone alone, or by acetone to which has been added an acid or a substance soluble in the acetone or capable of being combined therewith, has in addition to the advantages of plasticity and solubility, the property of being penetrable at high densities by substances which render the mass insoluble, such as formic aldehyde either in a state of vapor, or in solution.

There can also be combined or mixed with the above described product bodies such as metallic oxids, various salts, gums, coloring matters, and the like, either in order to bleach, or to color or clarify same, that is to say, generally to give it the desired properties according to its intended use. The proportions of acetone and acid mentioned can also be considerably varied whether these substances are employed singly or jointly and acetone may be replaced by its homologues or derivatives.

What we claim as our invention and desire to secure by Letters Patent of the United States is:—

1. The process for the production of a plastic product which consists in adding to casein a small percentage of an acetone, subjecting the mixture to a temperature of over 100° centigrade and finely dividing the resulting material.

2. The process for the production of a plastic product which consists in adding to casein an acidulating material and a ketone in substantially equal proportions, subjecting the mixture to a temperature of over 100° centigrade and finely dividing the resulting material while still hot.

3. The herein described process for the production of a plastic product which consists in adding to casein a small percentage of acetone and subjecting the mixture while under pressure greater than atmospheric pressure to the action of heat.

4. The herein described process for the production of a plastic product which consists in adding to casein a small percentage of acetone, subjecting the mixture while under pressure greater than atmospheric pressure to the action of heat and finely subdividing the resulting material while still hot.

5. The herein described process for the production of a plastic product which consists in adding to casein a small percentage of acetone, subjecting the mixture while under pressure greater than atmospheric pressure to a temperature of over 100° centigrade and finely subdividing the resulting material while still hot.

In witness whereof we have signed this specification in the presence of two witnesses.

FRANCOIS LEBREIL.
RAOUL DESGEORGE.

Witnesses:
  THOMAS N. BROWNE,
  GASTON JEANNIAUX.